(12) United States Patent
Tsai

(10) Patent No.: US 6,776,267 B2
(45) Date of Patent: Aug. 17, 2004

(54) BRAKE DEVICE FOR CYCLES HAVING SPRING SUPPORTING SEAT

(76) Inventor: Shih Fan Tsai, P.O. Box 63-99, Taichung (TW), 406

( * ) Notice: Subject to any disclaimer, the term of this patent is extended or adjusted under 35 U.S.C. 154(b) by 0 days.

(21) Appl. No.: 10/261,307

(22) Filed: Sep. 27, 2002

(65) Prior Publication Data

US 2004/0060778 A1 Apr. 1, 2004

(51) Int. Cl.[7] .................................................. B62L 1/06
(52) U.S. Cl. .................................. 188/24.19; 188/24.12
(58) Field of Search ............................ 188/24.11–24.22

(56) References Cited

U.S. PATENT DOCUMENTS 4,852,698 A * 8/1989 Nagano ................... 188/24.19
5,562,185 A   10/1996 Chen ....................... 188/24.12
5,740,889 A   4/1998 Tsai ........................ 188/24.19

FOREIGN PATENT DOCUMENTS

AT              0234532   *  7/1964  .............. 188/24.12

* cited by examiner

Primary Examiner—Chris Schwartz

(57) ABSTRACT

A brake device for cycle includes two brake arms pivotally secured together, and each having a brake shoe attached to one end for braking purposes, a brake cable coupled to the other ends of the brake arms for forcing the brake shoes to brake the cycle, and a spring member having one end attached to the cycle. One of the brake arms includes an extension having a depression for receiving the other end of the spring member. A cushioning member may be received in the extension and engaged with the spring member for cushioning the other end of the spring member.

5 Claims, 3 Drawing Sheets

BRAKE DEVICE FOR CYCLES HAVING SPRING SUPPORTING SEAT

BACKGROUND OF THE INVENTION

1. Field of the Invention

The present invention relates to a brake device, and more particularly to a brake device for cycles and having a supporting seat for suitably supporting spring members.

2. Description of the Prior Art

Typical brake devices for cycles comprise a pair of brake arms each having a brake shoe attached thereto for engaging with wheel rims and for braking wheels of cycles. Some of the typical brake devices may include one or more spring members for engaging with the brake arms and for biasing the brake arms to cause or to force the brake shoes to engage with the wheel rims.

U.S. Pat. No. 5,562,185 to Chen, and U.S. Pat. No. 5,740,889 to Tsai disclose two of the typical brake devices each having a spring member for engaging with the brake arms. However, the brake arms each includes a headed metal projection for engaging with and for resting the spring member. The spring member and the metal projection are both made of hard or metal materials, such that the spring member may not be stably supported in place with the metal projection, and the spring member may be damaged due to frictional scraping with the metal projection.

The present invention has arisen to mitigate and/or obviate the afore-described disadvantages of the conventional brake devices.

SUMMARY OF THE INVENTION

The primary objective of the present invention is to provide a brake device for cycles and having a supporting seat for suitably supporting spring members.

In accordance with one aspect of the invention, there is provided a brake device for cycle, the brake device comprising a first brake arm and a second brake arm pivotally secured together, for attaching to the cycle, and each including a first end having a brake shoe attached thereto for braking purposes, and each including a middle portion and a second end, a brake cable coupled to the second ends of the first and the second brake arms, for moving the second ends of the first and the second brake arms toward and away from each other, a spring member including a first end for attaching to the cycle, and a second end, the first brake arm including an extension extended therefrom and having a depression formed therein for receiving the second end of the spring member, and means for cushioning the second end of the spring member, and thus for stably and resiliently receiving and retaining the second end of the spring member in the extension of the first brake arm.

The extension is a preferably tubular extension having a bore formed therein and communicating with the depression of the extension. The second end of the spring member may thus be engaged into the bore of the extension of the first brake arm.

The cushioning means includes a cushioning member received in the bore of the extension and engaged with the second end of the spring member for cushioning the second end of the spring member.

The cushioning member includes a recess formed therein and aligned with the depression of the extension for receiving and seating the second end of the spring member.

A link may further be provided and includes a first end pivotally coupled to the middle portion of the first brake arm, and a second end pivotally coupled to the middle portion of the second brake arm.

The link includes a cavity formed in the first end thereof for receiving the first end of the spring member.

A protective sleeve is further provided and engaged with the second end of the first brake arm, the brake cable is engaged through the protective sleeve and the second end of the first brake arm and secured to the second end of the second brake arm.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
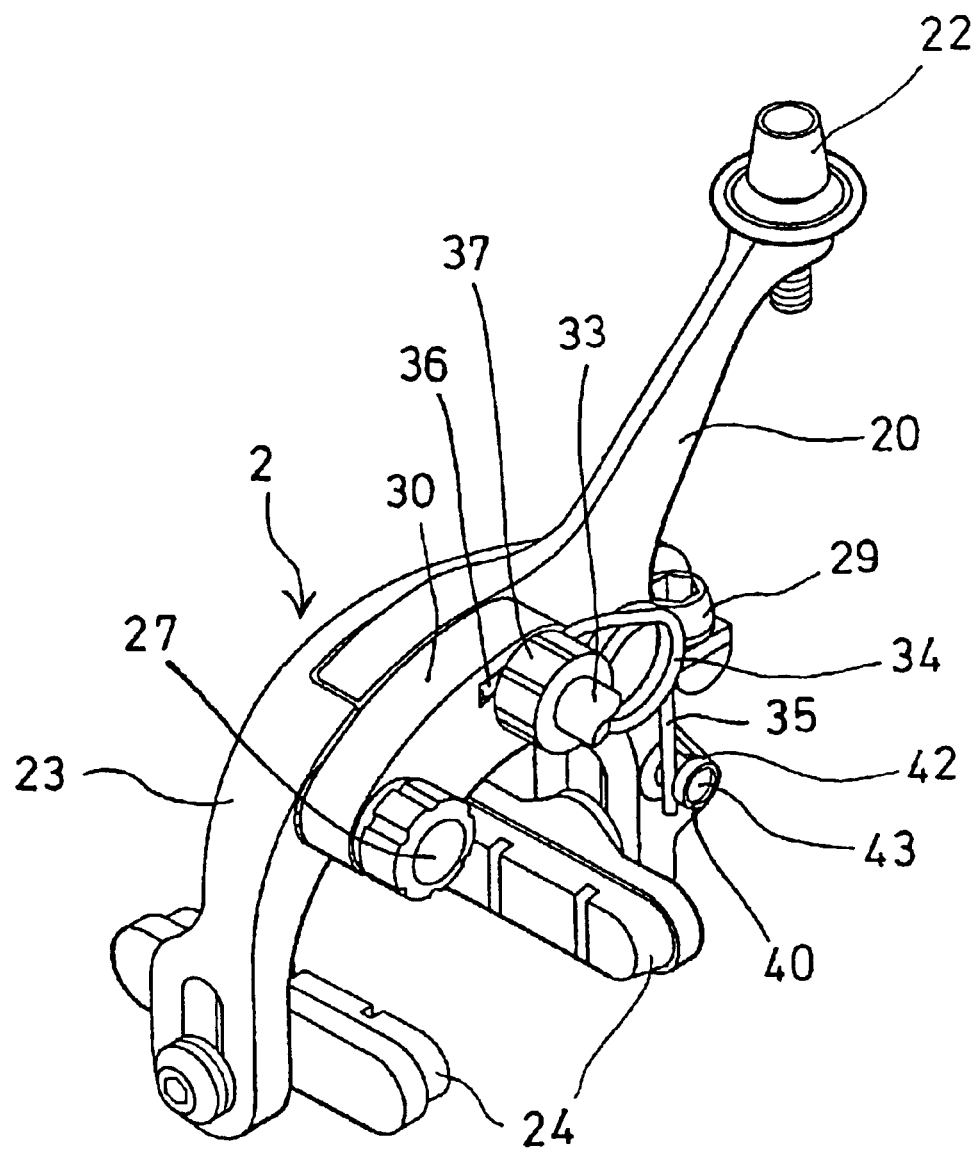
FIG. 1 is a perspective view of a brake device in accordance with the present invention.
Figure 2:
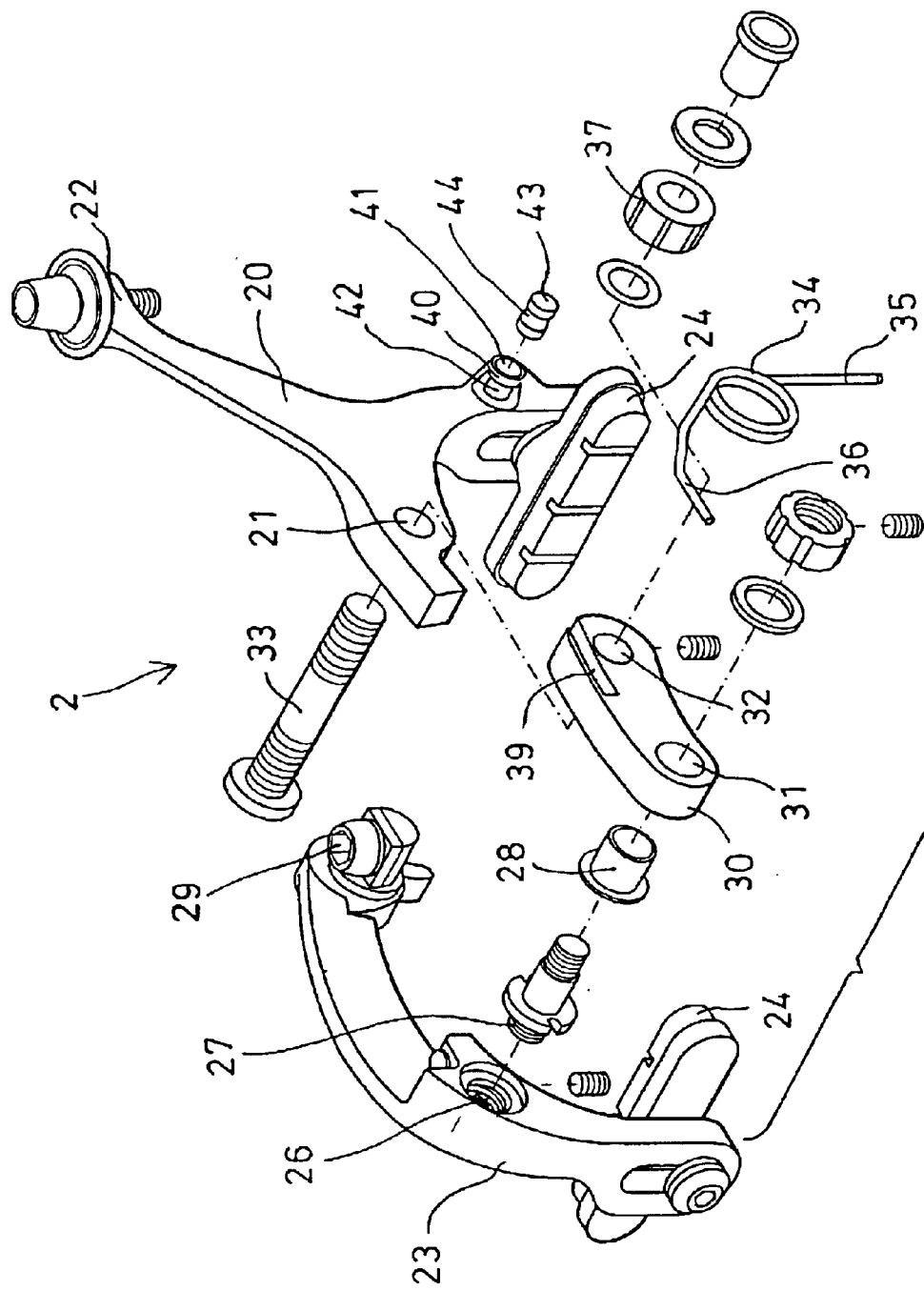
FIG. 2 is an exploded view of the brake device.

Referring to the drawings, and initially to FIGS. 1 and 2, a brake device 2 in accordance with the present invention comprises two brake arms 20, 23 each having a brake shoe 24 attached thereto, such as attached to the lower end thereof, for engaging with typical cycle wheel rims and for braking typical wheels of cycles.

The brake arm 20 includes an orifice 21 formed in the middle portion thereof for receiving a fastener 33, and includes a coupler 22 provided on one end, such as the upper end thereof for seating the protective sleeve 73 of the brake cable 71 of cycles (FIG. 3), and for allowing the brake cable 71 to slidably engage through both the sleeve 73 and the coupler 22.

The other brake arm 23 includes an aperture 26 formed in the middle portion thereof for receiving a fastener 27 and/or a collar 28, and includes one end, such as the upper end 29 secured to the brake cable 71 with a fastener (FIG. 3), such that the end 29 of the brake arm 23 may be moved toward and away from the coupler 22 of the brake arm 20 with the brake cable 71.

A link 30 includes a hole 31 formed in one end thereof for receiving the fastener 27, and another hole 32 formed in the other end thereof for receiving the fastener 33, and further includes a cavity 39 formed in the other end thereof, and spaced away from the hole 32 thereof. The brake arms 20, 23 may be pivotally secured together with the link 30 and the fasteners 27, 33.

A spring member 34 includes one end 35 to be attached or coupled or secured to the brake arm 20, and the other end 36 engageable into the cavity 39 of the link 30. A lock nut 37 may be threaded to the fastener 33 for securing the other end 36 of the spring member 34 to the other end of the link 30. The fastener 33 may be secured to the fork of the cycles (not shown), and thus for securing the brake device 2 to the cycles.

The brake arm 20 further includes an extension, such as a tubular extension 40 extended therefrom, and perpendicular or inclined relative to the brake arm 20, and having a bore 41 formed therein, and having a depression 42 formed therein and intersecting with or communicating with the bore 41 thereof, and preferably facing toward the link 30 or the fastener 27 or the brake shoe 24 of the other brake arm 23, for receiving the end 35 of the spring member 34.

A cushioning member 43 is preferably made of rubber or the other soft or resilient materials, and is engageable into the bore 41 of the extension 40, and preferably further includes a recess 44, such as a peripheral recess 44 formed in the outer peripheral portion thereof, and preferably aligned with the depression 42 of the extension 40, for receiving or seating the end 35 of the spring member 34.

Figure 3:
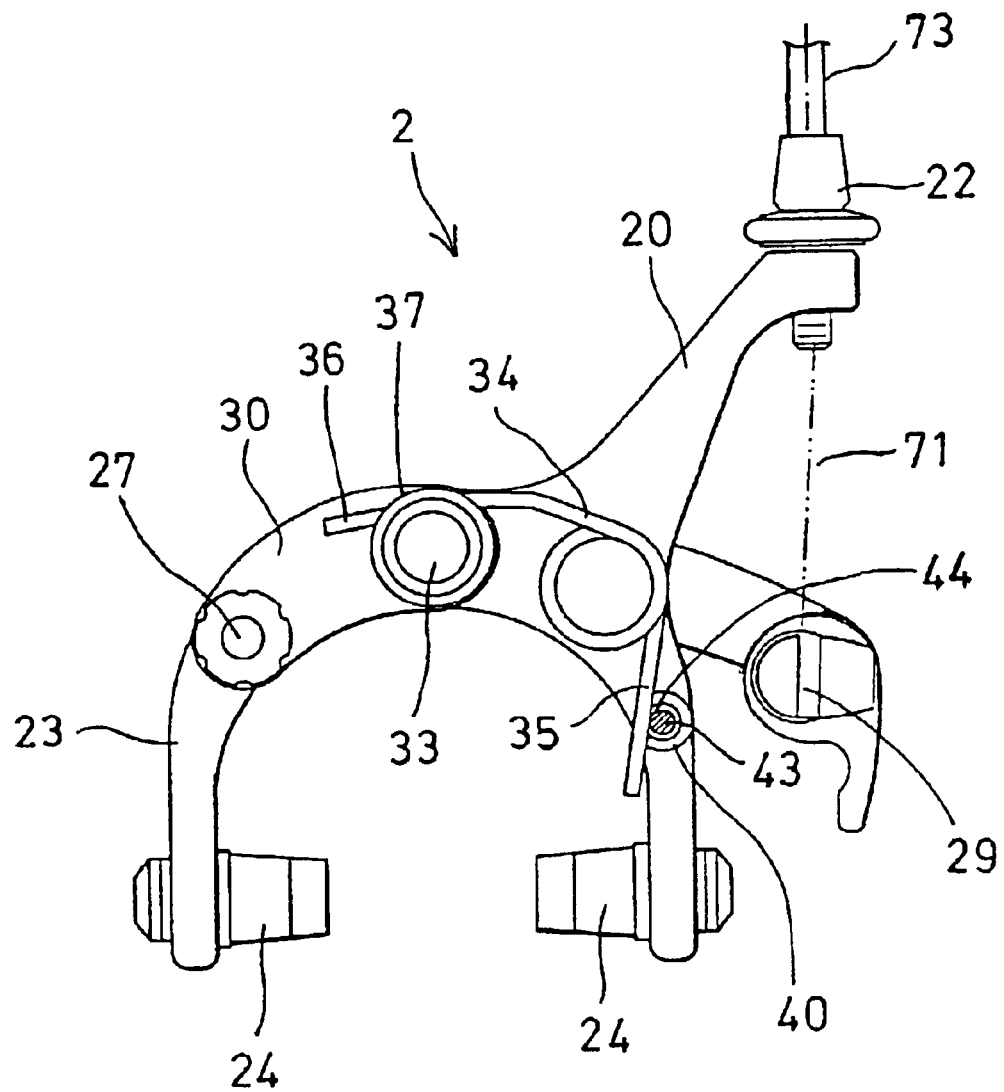
FIG. 3 is a plan schematic and partial cross sectional view illustrating the operation of the brake device.

As shown in FIGS. 1 and 3, the other end 36 of the spring member 34 is coupled or secured to the other end of the link 30 which is secured to the fork of the cycle with the fastener 33 and/or the lock nut 37, such that the other end 36 of the spring member 34 is also relatively secured to the fork of the cycle.

In operation, when the end 29 of the brake arm 23 is moved toward the coupler 22 of the brake arm 20 with the brake cable 71, the lower ends of the brake arms 20, 23 may be forced toward each other, for causing or forcing the brake shoes 24 to engage with the wheel rims and thus for braking the wheels of cycles.

When the brake cable 71 is released, the one end 35 of the spring member 34 may apply a spring force against the extension 40 of the brake arm 20, for biasing the brake shoe 24 of the brake arm 20 away from the wheel rim, and thus for preventing the brake shoes 24 from being engaged with the wheel rims of the typical wheels of cycles.

It is to be noted that the cushioning member 43 is made of rubber or the other soft or resilient materials which may be capable of stably retaining the one end 35 of the spring member 34 in the depression 42 of the extension 40. The cushioning member 43 may also be directly provided for seating the one end 35 of the spring member 34 without the recess 44 formed therein, and may be formed as a cushioning means for cushioning the end 35 of the spring member 34.

Accordingly, the brake device in accordance with the present invention includes a supporting seat for suitably supporting spring members.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A brake device for cycle, said brake device comprising:
    a first brake arm and a second brake arm pivotally secured together, for attaching to the cycle, and each including a first end having a brake shoe attached thereto for braking purposes, and each including a middle portion and a second end,
    a brake cable coupled to said second ends of said first and said second brake arms, for moving said second ends of said first and said second brake arms toward and away from each other,
    a spring member including a first end for attaching to the cycle, and a second end,
    a link including a first end pivotally coupled to said middle portion of said first brake arm, and a second end pivotally coupled to said middle portion of said second brake arm, said link including a cavity formed in said first end thereof for receiving said first end of said spring member,
    said first brake arm including an extension extended therefrom and having a depression formed therein for receiving said second end of said spring member, and
    means for cushioning said second end of said spring member.

2. The brake device according to claim 1, wherein said extension is a tubular extension having a bore formed therein and communicating with said depression of said extension.

3. A brake device for cycle, said brake device comprising:
    a first brake arm and a second brake arm pivotally secured together, for attaching to the cycle, and each including a first end having a brake shoe attached thereto for braking purposes, and each including a middle portion and a second end,
    a brake cable coupled to said second ends of said first and said second brake arms, for moving said second ends of said first and said second brake arms toward and away from each other,
    a spring member including a first end for attaching to the cycle, and a second end,
    said first brake arm including a tubular extension extended therefrom and having a bore formed therein and having a depression formed therein and communicating with said bore of said extension, for receiving said second end of said spring member, and
    means for cushioning said second end of said spring member, said cushioning means including a cushioning member received in said bore of said extension and engaged with said second end of said spring member for cushioning said second end of said spring member.

4. The brake device according to claim 3, wherein said cushioning means includes a recess formed therein and aligned with said depression of said extension for receiving and seating said second end of said spring member.

5. The brake device according to claim 1 further comprising a protective sleeve engaged with said second end of said first brake arm, said brake cable being engaged through said protective sleeve and said second end of said first brake arm and secured to said second end of said second brake arm.

* * * * *